Feb. 10, 1959  E. L. RICH ET AL  2,872,857
ADAPTOR PLUGS FOR CAMERAS
Filed July 27, 1953
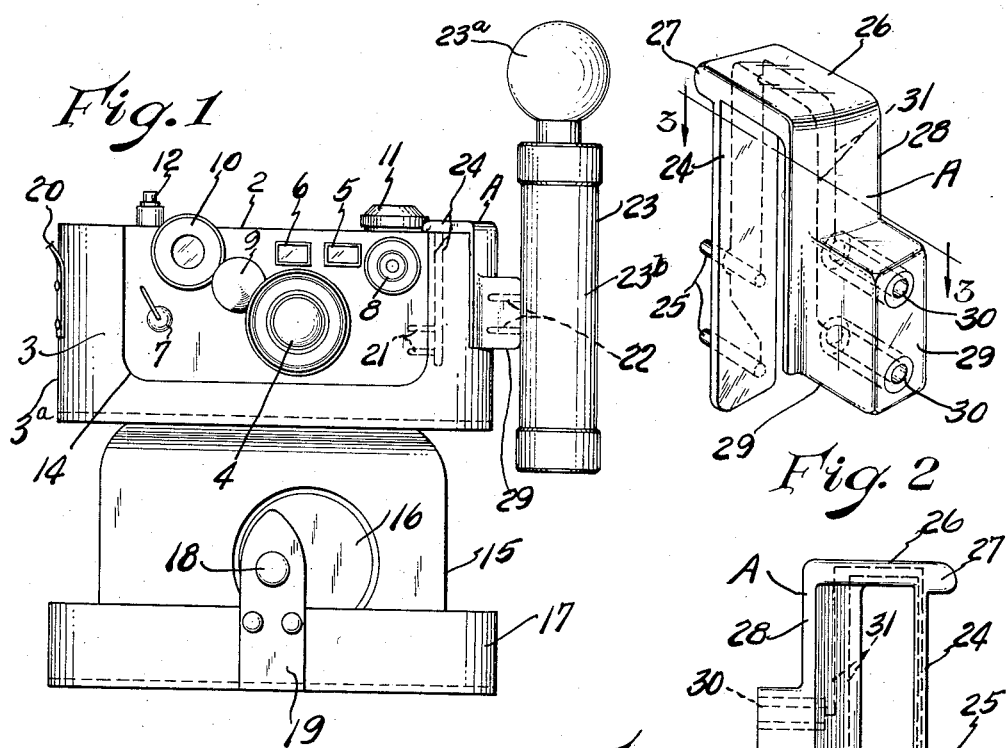
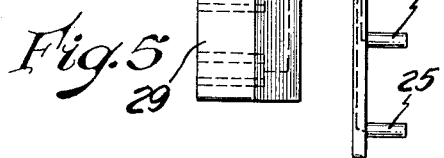
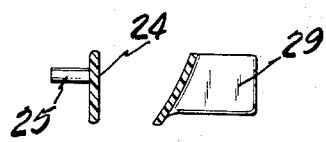
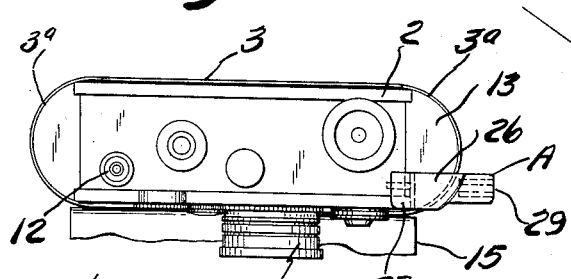
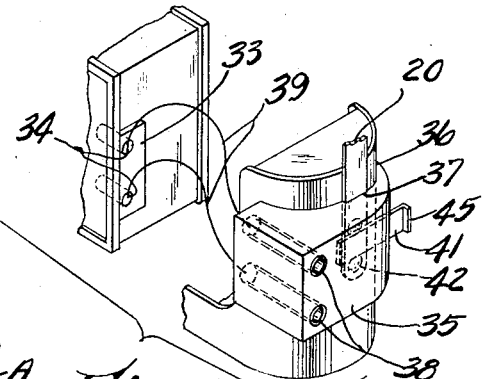
Inventors
Edward L. Rich.
Russell H. Turner
By Harmon † Harmon
ATTORNEYS

United States Patent Office 2,872,857
Patented Feb. 10, 1959

2,872,857

ADAPTOR PLUGS FOR CAMERAS

Edward L. Rich and Russell H. Turner, Bay City, Mich.; said Rich assignor to said Turner Application July 27, 1953, Serial No. 370,474

5 Claims. (Cl. 95—11.5)

This invention relates to adaptor plugs for cameras which are normally encased in conventional carrying cases which cover the sockets for attaching the flash bulb unit.

As is well-known, conventional leather carrying cases for many cameras include a flap which closes the top side and a portion of the front thereof, and which can be unfastened and swung out to expose the lens and focusing window and permit pictures to be snapped while the camera is still in the case. The sockets for reception of the flash unit contactors are, however, normally located in one of the end walls of the camera covered by the case, and it has heretofore been impossible to mount the flash unit on the camera without removing the camera from the case.

One of the prime objects of our invention is to provide a current conducting adaptor plug which extends outside the conventional case and is provided with sockets to permit the flash unit to be mounted thereon. Thus, it will no longer be necessary, when artificial light must be provided, to remove the camera from present cases of this type before snapping a picture.

A further object of the invention is to provide a plug which is readily adaptable to existing carrying cases and cameras and permits their use to snap candid pictures with a flash bulb without any changes in their design. The opportunity for taking most candid short has obviously passed by the time a camera is removed from its case, and a flash gun mounted thereon. The instant device permits the camera to be maintained in a state of readiness, since the camera protected by the case, can be stored or carried with the flash gun in position, or relatively near at hand so that it can be very quickly mounted.

Another object of the invention is to provide an adaptor which permits the camera to remain in its protective case at all times, the case being supported by its strap which is carried on the shoulder of the photographer, thus eliminating the danger of the photographer's dropping and damaging the camera.

A further object of the invention is to design an adaptor which permits flash pictures to be taken without removing the camera from its case so that there is no danger of the picture's being obscured or clouded by smudges which often are placed on the lens through inadvertent handling thereof when removing the camera from its case.

Another object of the invention is to provide an adaptor plug of the type described, which is attractive in appearance and is formed to snugly fit the rounded end wall of the case, thus permitting the flash gun to be most suitably positioned for snapping the picture.

A still further object of the invention is to design an adaptor plug which can be very economically formed in large quantities.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

In the drawing:

Fig. 1 is a front elevational view of a camera and case with the flap of the case swung down so that a picture can be snapped, the adaptor plug being shown in position and a flash unit being shown mounted thereon.

Fig. 2 is a perspective view of the adaptor plug.

Fig. 3 is a transverse sectional view taken on the line 3—3 of Fig. 2, illustrating the curvature of the leg which engages the rounded end wall of the carrying case.

Fig. 4 is a top plan view of the camera, with the flap of the case swung down to illustrate the position of the adaptor plug.

Fig. 5 is a side elevational view of the adaptor plug only.

Fig. 6 is an exploded, fragmentary, perspective view of the camera and case illustrating a modified embodiment of the invention.

Referring now to the accompanying drawing and more particularly to Figs. 1–5 in which we have shown the preferred embodiment of our invention, a letter A generally indicates our adaptor plug which is shown in Fig. 1 mounted on a camera 2 which is encased in a conventional leather carrying and protective case 3. While we will not describe all of the various features of the camera, briefly, the lens of the camera is indicated by the numeral 4, the viewer window at 5, the range finder window at 6, the shutter setting lever at 7, the shutter speed dial at 8, the lens adjusting gear and range finder dial at 9 and 10, the film winding knob at 11, and the shutter release at 12.

The case 3 is shaped to fit the generally prismatic camera and has attractively rounded walls 3a with felt covered, semi-cylindrical blocks 13 therein which cushion the ends of the camera in the event of a blow or impact. The front wall of the case is cut away as at 14 to expose the lens 4 of the camera and thus permit pictures to be taken when the flap 15 is swung down. The flap 15 conventionally includes a front portion with a lens protecting projection 16 and a top side portion of sufficient length and with rounded ends to cover the open top of the case, the top portion having a depending rim 17 which fits over the walls of the case as usual. The flap 15 can be secured in position by a conventional snap fastener, one element of which appears in Fig. 1 as at 18 on the fastening tab 19. A carrying strap 20 is mounted on the case and generally is looped around the shoulder of the photographer.

Sockets 21 are provided in the one wall of the camera which it is to be observed, is covered by the case 3. The sockets 21 are presently provided to accommodate the contactors 22 of a conventional flash unit or gun 23 which includes a bulb 23a and a battery casing 23b.

As previously noted, it will obviously be impossible so long as cameras and cases of the present design are manufactured, to take flash pictures without removing the camera from its case. Many thousands of photographers have purchased and presently use cameras and cases of this design. We have therefore designed an attractively formed and electrically conductive adaptor plug which can be readily mounted in position and thereafter becomes an integral part of the case and camera unit.

This plug, which is preferably formed of a clear plastic of a color corresponding to the case, although it could be formed of any suitable material, is essentially U-shaped to straddle the end wall of the case, and includes a base or leg portion 24 with contactor prongs 25 projecting therefrom which, as clearly shown in Fig. 1, are adapted to be accommodated in the sockets 21. The body portion 26 of the plug is formed with a projecting extension 27 which engages the top side wall of the camera when the device is in position thereon. The leg 28 of the adapter which engages the outer face of the case is of arcuate cross section to snugly engage the rounded corner 3a of the case and permit the rim 17 of the flap 15 to fit thereover.

Formed on the free end of the leg 28 is a block-like projection 29 in which are provided electrically conductive metal sockets 30, and it will be apparent that the wires 31 which are cast in the plug connect the sockets 30 and contactor prongs 25. As clearly shown in Fig. 1, once the adaptor plug A is mounted in the sockets 21 provided in the end wall of the camera, the flash gun 23 can simply be mounted in the sockets 30 of the plug.

In Fig. 6 we have shown a modified embodiment of our invention, wherein a plate 33 with contactors 34 adapted to be received in the sockets 21 in the end wall of the camera is formed separately from an outer flash unit receiving member 35 which fits over the end wall of the case. The member 35 is recessed as at 36 to fit the end wall of the case, and a slot 37 is provided which fits over the carrying strap 20 when the member 35 is in position. Note that on the right hand side in the drawing, the outer wall of the member 35 is curved in conformity with the case and that on the left hand side, a block-like socket receiving portion is provided with openings thereto to receive electrically conductive metal sockets 38. Insulated wires 39 of sufficient length to extend up the outer wall of the case and down the inner wall to the contactors 34 on the plate 33, connect the contactors 34 with the sockets 38. The member 35 is retained on the case by an insert 41 which extends through a slot formed in the wall thereof near the right edge thereof, the inner end of the insert 41 passing under the loop of the strap 20 between the rivets 42 which secure it to the case. A lip 43 is provided on the outer end of the insert 41 to facilitate manipulation thereof.

As will be apparent, the plate 33 and member 35 are most conveniently left on the case once they are mounted in position and the contactors of the flash bulb unit can be inserted in the sockets 38 and removed as desired. Removal of the adaptor unit from the case is accomplished very readily by pulling the insert 41 outwardly to release the member 35 and thence removing the contactors 34 of the plate 33 from the camera sockets 21.

It will thus be apparent that we have invented a novel and unique adaptor unit for cameras and cases of the previously described design which can be economically manufactured and sold to purchasers of these cameras and cases to permit them to snap flash pictures without removing the cameras from their cases.

What we claim is:

1. A flash bulb unit supporting adaptor plug in combination with a camera having sockets in a wall covered by a carrying case which has an open section adjacent the wall, comprising; a member having a leg disposed inside the case in engagement with said wall of the camera and a portion disposed outwardly of the case, said leg extending out from the open section of said case, contactor prongs on said leg for accommodation in said sockets, sockets in the portion of said member disposed outwardly of the case to accommodate the contactor prongs of a flash bulb unit, and wire conductors embedded in said member connecting the prongs on said leg and the sockets in said member.

2. An adaptor plug for accommodating the contactors of a flash bulb unit in combination with a camera and carrying case for the camera, the camera having sockets in a wall covered by the carrying case, and the case having an open section thereadjacent covered by a flap with a depending rim thereon to fit over the edges of the case, comprising; a generally U-shaped member having a leg disposed inside the case in engagement with said wall of the camera, said leg extending out from the open section of said case, the opposite leg of said member being disposed along the outer face of the wall of said case, contactor prongs projecting from the free end of said first-mentioned leg adapted to be accommodated in said sockets, an outwardly projecting block formed on said second-mentioned leg, sockets formed in said block to accommodate the contactors of said flash bulb unit, and conductor wires embedded in said member connecting the contactor prongs thereof and the sockets therein.

3. The combination with a camera having sockets in an end wall thereof and a protective carrying case for said camera of the general shape of said camera and having an open top adjacent said end wall, said case including an end wall covering said end wall of the camera and having a flap with a dependending rim adapted to fit over the marginal edges of the case adjacent said open top of the case, of a flash bulb unit having contactor prongs, and a generally U-shaped member straddling the said end wall of the case with a leg disposed inside the case, and a leg disposed outside the case, a portion connecting said legs extending transversely of the exposed edge of the end wall of said case, prongs formed on the leg inside said case for accommodation in the sockets in the end wall of said camera, an outwardly projecting block formed on said leg outside said case, electrically conductive sockets provided in said block to accommodate the contactors of said flash bulb unit, and conductor wires connecting the prongs of said member and the sockets in said block.

4. The combination defined in claim 3 in which a projection on the connecting body of said member engages the top wall of the camera.

5. The combination defined in claim 3 in which the end walls of said case are rounded and the leg of said member disposed on the outside of said case is curved to snugly engage the adjacent end wall of said case.

References Cited in the file of this patent

UNITED STATES PATENTS

| | | |
|---|---|---|
| 1,731,661 | Hauenstein | Oct. 15, 1929 |
| 2,096,856 | Nuchterlein | Oct. 26, 1937 |
| 2,133,985 | Green | Oct. 25, 1938 |
| 2,213,749 | Strauss | Sept. 3, 1940 |
| 2,247,809 | Hartman et al. | July 1, 1941 |
| 2,465,419 | Barany | Mar. 29, 1949 |
| 2,474,356 | Harris | June 28, 1949 |
| 2,602,879 | Whelan | July 8, 1952 |
| 2,795,639 | Rawson | June 11, 1957 |